United States Patent
Corveleyn et al.

(10) Patent No.: US 7,070,842 B2
(45) Date of Patent: Jul. 4, 2006

(54) METHOD OF BONDING A FLUOROELASTOMER LAYER TO A SILICONE RUBBER LAYER, LAMINATE FOR USE IN SAID METHOD AND ARTICLE PRODUCED THEREWITH

(75) Inventors: Steven Corveleyn, Knokke-Heist (BE); Alain Verschuere, Ghent (BE)

(73) Assignee: 3M Innovative Properties Company, St. Paul, MN (US)

( * ) Notice: Subject to any disclaimer, the term of this patent is extended or adjusted under 35 U.S.C. 154(b) by 280 days.

(21) Appl. No.: 10/757,044

(22) Filed: Jan. 14, 2004

(65) Prior Publication Data
US 2004/0175526 A1 Sep. 9, 2004

(51) Int. Cl.
*B32D 27/26* (2006.01)
*F16L 11/04* (2006.01)

(52) U.S. Cl. .................. 428/36.91; 428/421; 428/447; 156/307.1; 156/329

(58) Field of Classification Search ............. 428/36.91, 428/421, 447; 156/307.1, 329
See application file for complete search history.

(56) References Cited

U.S. PATENT DOCUMENTS

| | | | |
|---|---|---|---|
| 3,876,654 A | | 4/1975 | Pattison |
| 3,967,042 A | * | 6/1976 | Laskin et al. ................ 428/422 |
| 4,233,421 A | | 11/1980 | Worm |
| 4,335,238 A | | 6/1982 | Moore et al |
| 4,912,171 A | | 3/1990 | Grootaert et al |
| 5,086,123 A | | 2/1992 | Guenthner et al |
| 5,217,837 A | * | 6/1993 | Henry et al. ................ 430/124 |
| 5,262,490 A | | 11/1993 | Kolb et al |
| 5,591,804 A | | 1/1997 | Coggio et al |
| 5,720,703 A | * | 2/1998 | Chen et al. .................... 492/56 |
| 5,929,169 A | | 7/1999 | Jing et al |
| 5,998,034 A | * | 12/1999 | Marvil et al. ................ 428/422 |
| 6,020,038 A | | 2/2000 | Chen et al |
| 6,096,429 A | | 8/2000 | Chen et al |
| 6,224,978 B1 | | 5/2001 | Chen et al |
| 6,447,916 B1 | * | 9/2002 | Van Gool .................... 428/420 |
| 6,838,140 B1 | * | 1/2005 | Heeks et al. ................ 428/36.8 |
| 6,906,145 B1 | * | 6/2005 | Govaerts et al. .......... 525/326.3 |
| 6,916,871 B1 | * | 7/2005 | Hare et al. .................... 524/265 |
| 2002/0102410 A1 | * | 8/2002 | Gervasi et al. ............. 428/421 |
| 2004/0175526 A1 | * | 9/2004 | Corveleyn et al. ........ 428/36.91 |

FOREIGN PATENT DOCUMENTS

| | | |
|---|---|---|
| EP | 0 661 304 A1 | 7/1995 |
| EP | 0 769 521 A1 | 4/1997 |
| EP | 0 784 064 A1 | 7/1997 |
| EP | 001454740 A1 * | 9/2004 |
| JP | 07034060 A | 2/1995 |
| WO | WO 00/13891 | 3/2000 |

* cited by examiner

*Primary Examiner*—D. Lawrence Tarazano
(74) *Attorney, Agent, or Firm*—Brian E. Szymanski

(57) ABSTRACT

The present invention provides a method of bonding a fluoroelastomer layer to a silicone rubber layer, the method comprising the steps of:
(i) providing a layer of a curable fluoropolymer composition comprising (a) a fluoropolymer capable of being dehydrofluorinated thereby forming reactive sites, (b) a dehydrofluorinating agent, (c) a curing agent capable of cross-linking said fluoropolymer through reaction with said reactive sites and (d) a peroxide;
(ii) contacting said layer of said curable fluoropolymer composition with a curable silicone layer comprising a silicone resin and a peroxide;
curing said layers while being in contact with each other at conditions sufficient to (a) cause dehydrofluorination of said fluoropolymer and cross-linking of said fluoropolymer layer and (b) cross-linking of said silicone resin, said curing being carried out in the presence of a bonding promoter selected from the group consisting of an organic compound having one or more nucleophilic groups capable of reacting with said reactive sites of said fluoropolymer or having a precursor of said nucleophilic groups and one or more functional groups selected from ethylenically unsaturated groups, siloxy groups having at least one hydrolysable group and mixtures thereof, said bonding promoter being present in said layer of curable fluoropolymer and/or said curable silicone layer. Further provided are a laminate for use in the above method and articles that can be obtained with the method.

22 Claims, No Drawings

US 7,070,842 B2

METHOD OF BONDING A FLUOROELASTOMER LAYER TO A SILICONE RUBBER LAYER, LAMINATE FOR USE IN SAID METHOD AND ARTICLE PRODUCED THEREWITH

This application claims priority from European Patent Application Serial No. 03100534.1, filed Mar. 4, 2003.

1. FIELD OF THE INVENTION

The present invention relates to a method of bonding a fluoroelastomer layer to a silicone rubber layer. In particular, the present invention relates to the use of a particular bonding promoter in the composition for making the fluoroelastomer layer and/or the composition for making the silicone rubber layer. The present invention also relates to a laminate for use in said method and to an article produced with the method.

2. BACKGROUND OF THE INVENTION

The beneficial properties of fluoropolymers, i.e. polymers having a fluorinated backbone, are well known in the art and include for example, high temperature resistance, high chemical resistance including for example high resistance to solvents, fuels and corrosive chemicals, and non-flammability. Because of these beneficial properties, fluoropolymers find wide application particularly where materials are exposed to high temperature and/or chemicals. Fluoroelastomers may be obtained upon curing or vulcanization of a fluoropolymer. Generally, fluoropolymers for making fluoroelastomers are generally amorphous polymers.

Fluoroelastomers are used in fuel management systems which include for example fuel tanks, fuel filler lines and fuel supply lines in cars or other motor vehicles because of their excellent resistance to fuels and because of the good barrier properties that can be achieved with fluoropolymers. Additionally, fluoroelastomers, may be used in a hose connecting the compressor of a turbo engine with an intercooler. Because of the high temperature of the compressed air, non-fluorine elastomers such as ethylene acrylic based elastomers or silicone elastomers cannot be used for such a hose.

Fluoropolymers are generally more expensive than non-fluorine polymers and accordingly, materials have been developed in which the fluoropolymer is used in combination with other materials to reduce the overall cost of an article. For example, in the aforementioned hose used in turbo engines, it has been proposed to use a relatively thin layer of fluoroelastomer as an inner layer of a multilayer hose where the outerlayer of the hose is then a non-fluorine elastomer such as for example a silicone elastomer. It is required in such a multilayer hose that the fluoropolymer layer be firmly and reliably bonded to the other layers of the hose. Unfortunately, bonding of a fluoroelastomer layer to other substrates is often difficult and in particular bonding to silicone elastomers has been found difficult. This is further complicated by the fact that various silicone compositions exist such that in one instance a particular fluoroelastomer composition may show good bonding, yet in another instance satisfactory bonding may not be obtained.

A further application in which a multi-layer article including a fluoropolymer layer is used is in a fuser member of a plain paper copier. Such a fuser member typically has a thermally conductive silicone elastomer which is bonded to a fluoroelastomer surface layer which may also include conductive particles. Such a fuser member is disclosed in for example U.S. Pat. No. 5,217,837. This U.S. patent describes a multilayer fuser member in which the silicone elastomer is bonded to the fluoroelastomer with the intermediate of an adhesive layer. The manufacturing of such a fuser member is unfortunately cumbersome. A similar system is described in U.S. Pat. No. 6,020,038, U.S. Pat. No. 6,096,429 and U.S. Pat. No. 6,224,978.

Fluoroelastomers may be obtained through various curing mechanisms. For example, in one method, curing of the fluoropolymer layer may be caused by a so-called peroxide curing reaction wherein the fluoropolymer includes one or more halogens such as for example bromine or iodine as cure-sites and these cure-sites are reacted with an organic peroxide whereby a three-dimensional network is created between the fluoropolymers, thereby obtaining the fluoroelastomer. Another method of curing a fluoropolymer to make a fluoroelastomer involves the use of a fluoropolymer that is capable of dehydrofluorination. Dehydrofluorination of the fluoropolymer can be effected through a dehydrofluorinating agent and the so produced reactive sites can then further react with a suitable curing agent to cause vulcanization of the fluoropolymer. The latter method is generally more cost effective as the fluoropolymers used in that method are generally less expensive than the fluoropolymers that are used in the former method. But it has also been found that fluoroelastomers that are based on a dehydrofluorination mechanism for curing are more difficult to bond to silicone rubbers.

To solve the problem of bonding a fluoroelastomer to a silicone elastomer, tie layers have been proposed between the fluoroelastomer layer and silicone elastomer layer, but this increases cost and makes the manufacturing more complicated.

WO 00/13891 discloses that improved bonding of a fluoroelastomer layer to a silicone rubber may be obtained by contacting a composition comprising (a) a fluoropolymer capable of dehydrofluorination, (b) a dehydrofluorinating agent, (c) a curing agent such as a polyhydroxy compound, (d) a coagent such as triallylisocyanurate and (e) a peroxide. Good bonding strength to a silicone rubber layer is disclosed.

JP 1995034060 discloses the addition of a silane coupling agent such as gamma-aminopropyltrimethoxysilane to a fluoroelastomer that is based on vinylidene fluoride copolymer. Improved bonding to various substrates such as metal, ceramics, concrete and natural or synthetic resin is taught.

It would now be desirable to find a further way of improving bonding of a fluoroelastomer, in particular a fluoroelastomer based on dehydrofluorination for its curing, to silicone rubbers. Preferably, this solution is cost effective, convenient and reliable. Preferably, the bond strength achieved is sufficient to allow for use in automotive applications such as fuel management systems and turbo charge hoses.

3. SUMMARY OF THE INVENTION

In accordance with one aspect, the present invention provides a method of bonding a fluoroelastomer layer to a silicone rubber layer, the method comprising the steps of:
   (i) providing a layer of a curable fluoropolymer composition comprising (a) a fluoropolymer capable of being dehydrofluorinated thereby forming reactive sites, (b) a dehydrofluorinating agent, (c) a curing agent capable of cross-linking said fluoropolymer through reaction with said reactive sites and (d) a peroxide;

(ii) contacting said layer of said curable fluoropolymer composition with a curable silicone layer comprising a silicone resin and a peroxide;

curing said layers while being in contact with each other at conditions sufficient to (a) cause dehydrofluorination of said fluoropolymer and cross-linking of said fluoropolymer layer and (b) cross-linking of said silicone resin, said curing being carried out in the presence of a bonding promoter selected from the group consisting of an organic compound having one or more nucleophilic groups capable of reacting with said reactive sites of said fluoropolymer or having a precursor of said nucleophilic groups and one or more functional groups selected from ethylenically unsaturated groups, siloxy groups having at least one hydrolysable group and mixtures thereof, said bonding promoter being present in said layer of curable fluoropolymer and/or said curable silicone layer.

In another aspect, the present invention provides a laminate that may be used in connection with aforementioned method. The laminate comprises (i) a layer of a curable fluoropolymer composition comprising (a) a fluoropolymer capable of being dehydrofluorinated thereby forming reactive sites, (b) a dehydrofluorinating agent, (c) a curing agent capable of cross-linking said fluoropolymer through reaction with said reactive sites and (d) a peroxide; (ii) in direct contact with said layer of curable fluoropolymer composition, a curable silicone layer comprising a silicone resin and a peroxide and (iii) a bonding promoter contained in said layer of curable fluoropolymer composition and/or said curable silicone layer, said bonding promoter being selected from the group consisting of an organic compound having one or more nucleophilic groups capable of reacting with said reactive sites of said fluoropolymer or having a precursor of said nucleophilic groups and one or more functional groups selected from ethylenically unsaturated groups, siloxy groups having at least one hydrolysable group and mixtures thereof.

In a still further aspect of the invention, articles are provided that are obtainable with the above described method.

4. DETAILED DESCRIPTION OF THE INVENTION

Bonding Promoter

In accordance with the invention, a bonding promoter is included in the curable fluoropolymer composition for forming the fluoroelastomer layer and/or the composition for the curable silicone layer. The bonding promoter is an organic compound that contains one or more nucleophilic groups capable of reacting with the reactive sites of the fluoropolymer that are produced upon dehydrofluorination of the fluoropolymer and one or more functional groups selected from an ethylenically unsaturated group, a siloxy group having at least one hydrolysable group and mixtures thereof. Instead of the nucleophilic group, the organic compound may comprise a precursor thereof. Thus, the bonding promoter can be an organic compound that has one or more nucleophilic groups and/or precursors thereof, e.g. a siloxy group having a hydrolysable group, and one or more ethylenically unsaturated groups or the bonding promoter can be an organic compound that has one or more nucleophilic groups and one or more siloxy groups that have at least one hydrolysable group. Mixtures of bonding promoters can be used as well.

The amount of the bonding promoter that should be added generally depends on the nature of the bonding promoter and the other components of the composition to which the promoter is added. Suitable amounts can be readily determined by routine experimentation. Typical amounts of bonding promoter when added to the curable fluoropolymer composition are between 0.75 and 15% by weight, preferably between 2 and 6% by weight. When added to the curable silicone layer, the bonding promoter is generally used in an amount of 0.1 to 2% by weight, preferably between 0.25 and 0.75% by weight.

In accordance with one embodiment, the bonding promoter is a siloxane compound, i.e. a compound having one or more siloxy groups. Suitable siloxane compounds for use as a bonding promotor will contain a nucleophilic group (or precursor thereof) capable of reacting with the reactive sites produced upon dehydrofluorination of the fluoropolymer. Particularly suitable nucleophilic groups include hydroxy groups and amino groups. A suitable precursor of a nucleophilic group may be a group that under the curing conditions employed is capable of yielding a nucleophilic group, for example a siloxy group having a hydrolysable group can be employed as a precursor for hydroxy groups. In addition to a nucleophilic group or precursor thereof, the siloxane compound will also have one or more ethylenically unsaturated groups or alternatively one or more siloxy groups having one or more hydrolysable groups. Thus, in one embodiment, the siloxane compound may comprise two or more siloxy groups each having a least one hydrolysable group. In such a siloxane compound, one of the siloxy groups will be able to function as a precursor of the nucleophilic group which will react with the fluoropolymer whereas the other siloxy group during curing may react with the silicone resin in the curable silicone layer. Suitable hydrolysable groups of the siloxy group include alkoxy groups, acetyl groups and aryloxy groups. Particularly preferred hydrolysable groups are C1–C4 alkoxy groups such as methoxy, ethoxy and propoxy groups.

The siloxane compound may be a simple low molecular weight organic compound or may be a polymeric compound including for example a polysiloxane which may be linear, branched or cyclic.

Examples of simple low molecular weight siloxane compounds for use as a bonding promoter in the invention include compounds that can be represented by the following general formula:

$(Z)_i\text{-}Q\text{-}[Si(R^1)_xY_{3-x}]_j$     (I)

wherein Z represents OH or NHR with R representing hydrogen or a hydrocarbon group such an alkyl group preferably having 1 to 4 C atoms, Q represents an organic multivalent linking group such as for example an aliphatic or aromatic hydrocarbon group that may include one or more heteroatoms or functional groups such as an ester group, an amido group or a carbonyl group or halogens. Examples of linking groups Q include an alkylene group and an arylene group. i and j are integers of 1, 2 or 3 and are preferably each 1. The index x is an integer of 0, 1 or 2, Y represents a hydrolysable group such as mentioned above and $R^1$ is a hydrocarbon group such as an alkyl group or an aryl group.

Examples of compounds according to the above formula (I) include:

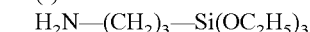
$H_2N-(CH_2)_3-Si(OC_2H_5)_3$

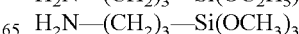
$H_2N-(CH_2)_3-Si(OCH_3)_3$

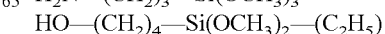
$HO-(CH_2)_4-Si(OCH_3)_2-(C_2H_5)$

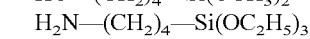
$H_2N-(CH_2)_4-Si(OC_2H_5)_3$

H$_2$N—(CH$_2$)$_2$—NH—CH$_2$—CH(CH$_3$)—CH$_2$—Si(OCH$_3$)$_3$
H$_2$N—(CH$_2$)$_2$—NH—(CH$_2$)$_2$—Si(CH$_3$)(OCH$_3$)$_2$
H$_2$N—(CH$_2$)$_2$—NH—(CH$_2$)$_3$—Si(OCH$_3$)$_3$
H$_2$N—(CH$_2$)$_6$—NH—(CH$_2$)$_3$—Si(OCH$_3$)$_3$
H$_2$N-m-C$_6$H$_4$—O—(CH$_2$)$_3$—Si(OCH$_3$)$_3$
H$_2$N-m-C$_6$H$_4$—Si(OCH$_3$)$_3$
H$_2$N-p-C$_6$H$_4$—Si(OCH$_3$)$_3$

Further examples of simple low molecular weight siloxane compounds for use as a bonding promoter include those according to the following formula:

$$E-Q^1-Si(R^2)_s Y^1_{3-s} \quad (II)$$

wherein E is an ethylenically unsaturated group, $Q^1$ is an organic divalent linking group or a chemical bond $R^2$ represents a hydrocarbon group such an alkyl or an aryl group, $Y^1$ represents a hydrolysable group and s is 0, 1 or 2. $Q^1$ generally comprises a linear or branched or cyclic hydrocarbon group that may be aromatic or aliphatic and may include one or more heteroatoms or functional groups such as an ester group, a amido group or a carbonyl group or halogens.

Examples of bonding promoters according to formula (II) include vinyltrimethoxysilane, hexenyltriethoxysilane, vinyltrimethoxysilane, vinyltriacetoxysilane, gamma-methacryloxypropyltrimethoxysilane and gamma-methacryloxypropyltriethoxysilane.

The siloxane compound may also be a oligomeric or polymeric siloxane. For example, the polysiloxanes for use with this invention include those that correspond to the formula:

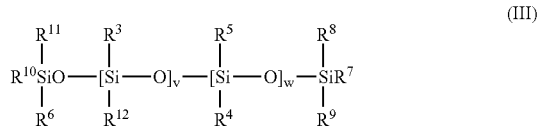

wherein $R^{3-12}$ each independently represents a hydrolysable group, a hydroxy group, NH$_2$, NHR with R representing a hydrocarbon group including linear, branched, cyclic saturated and unsaturated hydrocarbon groups such as an alkyl group preferably having 1 to 4 carbon atoms; with the proviso that at least one of $R^{3-12}$ is a group selected from a hydrolysable group, a hydroxy group, NH$_2$ and NHR and at least one of $R^{3-12}$ is a hydrocarbon group that contains an ethylenically unsaturated group. Preferably, at least one of $R^3$, $R^4$, $R^5$ and $R^{12}$ is a hydrocarbon group that contains an ethylenically unsaturated group such as a vinyl group. v and w each independently have a value of 0 to 20.

Particularly preferred polysiloxanes according to above formula (III) include those in which v has a value of 0 to 20, w is 0, $R^3$, $R^{11}$ and $R^8$ each independently represents a vinyl or an allyl group, $R^6$, $R^7$, $R^9$, $R^{10}$ and $R^{12}$ each independently represents a hydrolysable group, in particular an alkoxy group.

Bonding promoters according to formula (III) are preferably added to the curable fluoropolymer composition whereas bonding promoters according to formula (I) and (II) are preferably added to the curable silicone resin layer composition for best results.

Compounds according to formula (III) that are commercially available include vinylsilane 6490 DL70 and vinylsilane 6498 DL 70 available from Lehmann & Voss.

Still further, the bonding promoter may be an organic compound that has one or more amino or hydroxy groups and one or more ethylenically unsaturated groups. Such compounds include those corresponding to the formula:

$$(E)_n-Q^3-G_m \quad (IV)$$

wherein E represents an ethylenically unsaturated group, n is an integer of 1 to 5, typically 1, 2 or 3, $Q^3$ is an organic multivalent linking group comprising a linear, branched or cyclic saturated or unsaturated hydrocarbon group that may be substituted with a functional group such as a halogen, a carbonyl group, a carboxy group, an amido group or an ester and that may be interrupted with one or more heteroatoms such as oxygen or nitrogen, G represents a hydroxy group, NH$_2$ or NHR with R representing a hydrocarbon group such as an alkyl group and m is an integer of 1 to 5, typically 1, 2 or 3. Particular examples of groups $Q^3$ include aromatic groups such as phenyl and naphtyl group, saturated hydrocarbons such as alkylene groups having 2 to 10 carbon atoms, combinations of an alkylene and arylene group. Particular examples of compounds according to formula (IV) include the following compounds: 2,2'-diallylbisphenol A, 7-octene-1,2,-diol, p-vinylaniline, diallylamine, 3-aminopropylvinylether. Bonding promoters according to formula (IV) provide best results when added to the curable silicone resin layer.

The bonding promoters mentioned above can be in liquid or oily form. When the bonding promoter is a liquid or oily substance it will generally be preferred to adsorb the compound on a carrier prior to mixing with the fluoropolymer or silicone resin composition. Suitable carriers are generally solid carriers capable of adsorbing the bonding promoter. Typically, suitable carriers comprise carbon black or inorganic particles such as silicates, barium sulfate, clays, carbonates, calcium hydroxide, oxides like calcium oxide, magnesium oxide, chromium oxide, iron oxides and titanium oxide. Additionally carriers that can be used include organic carrier particles such as polymer powders, e.g. a polytetrafluoroethylene powder. To load the bonding promoter on the carrier, the carrier is mixed with the bonding promoter so as to adsorb the bonding promoter thereon. It is commercially most attractive that the carrier is fully saturated with the bonding promoter, i.e. the compound is added to the carrier until no further compound is adsorbed by it. The bonding promoter adsorbed on the carrier, for example adsorbed on carbon black or inorganic particles can then be easily blended into the fluoropolymer composition or the silicone resin composition.

Fluoropolymers

The composition for making the fluoroelastomer layer includes at least one fluoropolymer that is capable of being dehydrofluorinated. Generally, the fluoropolymer is also amorphous or substantially amorphous, i.e. does not display a significant melting point. In general, the fluoropolymer will readily dehydrofluorinate when exposed to a base and typically has the microstructure, generally in the polymer backbone, of a carbon bonded hydrogen atom between carbon bonded fluorine atoms to create a reactive site. The reactivity in dehydrofluorination of a carbon bonded hydrogen is further enhanced when its carbon atom is adjacent to, or attached to a carbon atom possessing a carbon bonded —CF$_3$ group (supplied by hexafluoropropylene (HFP) or 2-hydropentafluoropropylene for instance) or another electron withdrawing group. Preferably, the fluoropolymer capable of dehydrofluorination is derived from vinylidene fluoride ("VF2" or "VDF") and fluoropolymers derived from other monomers which, when polymerized, form monomer sequences similar to polymerized vinylidene fluoride. Examples of such other monomers include ethylenically unsaturated monomers which, when incorporated into fluoropolymers, can produce a similar (including an identical) polymeric microstructure as the polymerized VDF. Such polymers are also prone to dehydrofluorination thereby forming reactive sites that can react with the curing agent, described in more detail below, to cause cross-linking of the fluoropolymer thereby forming a fluoroelastomer. Monomers suitable for forming sites in the fluoropolymer that are capable of dehydrofluorination include VDF, 1-hydropentafluoropropene, 2-hydropentafluoropropene, and trifluoroethylene.

Dehydrofluorination of the fluoropolymer typically takes place during curing of the laminate, i.e. the reactive sites, typically double bonds within the backbone of the fluoropolymer are created in-situ. The fluoropolymers capable of dehydrofluorination generally comprise at least 3% by weight of interpolymerized units derived from VDF or other monomers with similar reactivity when polymerized. Homopolymers or copolymers with other ethylenically unsaturated monomers may be used. More preferably, the fluoropolymer capable of dehydrofluorination is formed from (i) a fluorine-containing, monomer selected from the group of vinylidene fluoride, trifluoroethylene, 1-hydropentafluoropropylene, 2-hydropentafluoropropylene, mixtures thereof, and optionally one or more monomers copolymerizable therewith. Typically the fluoropolymer includes units deriving from VDF and one or more fluorine-containing monomers such as hexafluoropropene (HFP), tetrafluoroethylene (TFE), chlorotrifluoroethylene (CTFE), 2-chloropentafluoropropene, a fluorinated vinyl ether, including a perfluoroalkyl vinyl ether such as $CF_3OCF=CF_2$ or $CF_3CF_2CF_2OCF=CF_2$. Certain fluorine-containing di-olefins are also useful, such as, perfluorodiallyether and perfluoro-1,3-butadiene. Further suitable comonomers include non-fluorinated monomers such as unsaturated olefin comonomers, e.g., ethylene, propylene or butadiene. Preferably, at least 50% by weight of all monomers in a polymerizable mixture are fluorine containing. In one particular embodiment, the fluoropolymer comprises a hexafluoropropylene-vinylidene fluoride-tetrafluoroethylene copolymer.

The fluoropolymer capable of dehydrofluorination may also include units deriving from iodine- or bromine-containing unsaturated olefin monomer. These monomers, sometimes referred to as cure-site monomers, are useful to prepare a peroxide curable polymer. Suitable cure-site monomers include terminally unsaturated monoolefins of 2 to 4 carbon atoms such as bromodifluoroethylene, bromotrifluoroethylene, iodotrifluoroethylene, and 4-bromo-3,3,4,4-tetrafluoro-1-butene.

The fluoropolymers can be made by well-known conventional means, for example by, free-radical polymerization of the monomers. The preparation of colloidal, aqueous dispersions of such polymers and copolymers is described, for example, in U.S. Pat. No. 4,335,238 (Moore et al.). Customary processes for making such fluoropolymers can include copolymerizing fluorinated olefins in aqueous, colloidal dispersions, which is carried out in the presence of water-soluble initiators which produce free radicals, such as, for example, ammonium or alkali metal persulfates or alkali metal permanganates, and in the presence of emulsifiers, such as the ammonium or alkali metal salts of perfluorooctanoic acid.

The composition for making the fluoroelastomer layer may further contain in admixture with the fluoropolymer(s) capable of dehydrofluorination, one or more fluoropolymers that are not capable of dehydrofluorination. Generally, a major amount (e.g. at least 51% by weight, preferably at least 60% by weight and more preferably at least 80% by weight based on the total weight of fluoropolymer) should be composed of the fluoropolymer capable of dehydrofluorination. Preferably, the fluoropolymer not capable of dehydrofluorination should be capable of cross-linking through another curing mechanism, e.g. through a peroxide cure mechanism. Accordingly, the fluoropolymer(s) capable of dehydrofluorination may be combined with one or more fluoropolymers that comprise units deriving from a cure site monomer, in particular, a cure site monomer having bromine or iodine atoms as described above.

Dehydrofluorinating Agent

The fluoropolymer capable of dehydrofluorination can be dehydrofluorinated with a dehydrofluorinating agent. Typically, the dehydrofluorinating agent is capable of dehydrofluorinating the fluoropolymer under the conditions necessary for curing the laminate. Conveniently, the dehydrofluorinating agent thereby forms double bonds in the fluoropolymer backbone.

Examples of materials useful as dehydrofluorinating, agents include organo-oniums and bases, such as 1,8 diaza [5.4.0]bicyclo undec-7-ene, (DBU) and 1,5-diazabicyclo [4.3.0]-5-nonene, (DBN). Many of the organo-onium compounds useful in this invention are described and known in the art. See, for example, U.S. Pat. Nos. 4,233,421 (Worm), 4,912,171 (Grootaert et al.), 5,086,123 (Guenthner et al.), and 5,262,490 (Kolb et al.), U.S. Pat. No. 5,929,169, all of whose descriptions are herein incorporated by reference. Representative examples include the following individually listed compounds and mixtures thereof:

triphenylbenzyl phosphonium chloride
tributylallyl phosphonium chloride
tributylbenzyl ammonium chloride
tetrabutyl ammonium bromide
triaryl sulfonium chloride
8-benzyl-1,8-diazabicyclo[5,4,0]-7-undecenium chloride
benzyl tris(dimethylamino)phosphonium chloride
benzyl(diethylamino)diphenylphosphonium chloride Another class of useful organo-onium compounds include those having one or more pendent fluorinated alkyl groups. Examples of fluorinated onium compounds are disclosed by Coggio et al. in U.S. Pat. No. 5,591,804. Preferred dehydrofluorinating agents include tributyl(2-methoxy)-propylphosphonuim chloride, triphenyl benzyl phosphonium chloride, complexes of tributyl(2-methoxy)-phosphonium chloride with bisphenol AF, and DBU. Combinations of dehydrofluorinating, agents may be employed if desired.

The dehydrofluorinating agent should generally be employed in an effective amount. An effective amount is that quantity of dehydrofluorinating agent necessary to cause curing of the fluoropolymer and to bond the fluoropolymer to the silicone polymer. The exact quantity of dehydrofluorinating agent to be employed is dependant upon the fluoropolymer employed and the reactivity of the other additives used and may be readily determined with routine experimentation. Within these parameters, an effective amount of dehydrofluorinating agent is generally from 0.01 to 20 parts per one hundred parts of the fluoropolymer. Preferred addition levels are from 0.1 to 5 parts per hundred.

Curing Agent

The curing agent for use in the fluoropolymer composition for obtaining the fluoroelastomer layer is a compound that is capable of reacting with the reactive sites produced upon dehydrofluorination of the fluoropolymer under the conditions of curing of the laminate, thereby creating crosslinks between the fluoropolymer chains. Generally, the curing agent comprises a plurality of nucleophilic groups capable of reacting with the reactive sites of the fluoropolymer. Typically, the curing agent will not contain ethylenically unsaturated groups. Suitable curing agents include those known in the art and in particular include polyhydroxy compounds or derivatives thereof, organic polyamines or derivatives thereof, and fluoroaliphatic polyols and carbonates of aromatic polyhydroxy compounds. A preferred class of curing agent includes the polyhydroxy compounds.

The polyhydroxy compound may be used in its free or non-salt form or as the anionic portion of an organo-onium. Combination of organo-onium compounds and polyhydroxy compounds are particularly preferred as in addition to being capable of acting as a dehydrofluorinating agent, the organo-onium may also accelerate the cross-linking reaction involving a polyhydroxy compound as curing agent (cross-linking agent). The crosslinking agent may be any of those polyhydroxy compounds known in the art to function as a crosslinking agent or co-curative for fluoroelastomers, such as those polyhydroxy compounds disclosed in U.S. Pat. Nos. 3,876,654 (Pattison), and 4,233,421 (Worm). Representative aromatic polyhydroxy compounds include any one of the following: di-, tri-, and tetrahydroxybenzenes, naphthalenes, and anthracenes, and bisphenols of the following formula:

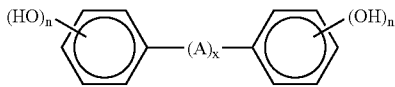

wherein A is a difunctional aliphatic, cycloaliphatic, or aromatic radical of 1 to 13 carbon atoms, or a thio, oxy, carbonyl, sulfonyl, or sulfonyl radical, A is optionally substituted with at least one chlorine or fluorine atom, x is 0 or 1, n is 1 or 2, and any aromatic ring of the polyhydroxy compound is optionally substituted with at least one atom of chlorine, fluorine, bromine, or with a carboxyl or an acyl radical (e.g., —COR where R is H or a C1 to C8 alkyl, aryl, or cycloalkyl group) or alkyl radical with, for example, 1 to 8 carbon atoms. It will be understood from the above bisphenol formula that the —OH groups can be attached in any position (other than number one) in either ring. Blends of two or more of these compounds are also used. One of the most useful and commonly employed aromatic polyphenols of the above formula is 4,4'-hexafluoroisopropylidenyl bisphenol, known more commonly as bisphenol AF. The compounds 4,4'-dihydroxydiphenyl sulfone (also known as Bisphenol S) and 4,4'-isopropylidenyl bisphenol (also known as bisphenol A) are also widely used in practice.

The curing agent or cross-linking agent is generally used in an amount of 0.2 to 10 parts by weight per 100 parts by weight of the fluoropolymer.

Peroxide

The fluoropolymer composition further includes a peroxide, typically an organic peroxide. Suitable organic peroxides are those which generate free radicals at curing temperatures. A dialkyl peroxide or a bis(dialkyl peroxide) which decomposes at a temperature above 50° C. is especially preferred. In many cases it is preferred to use a di-tertiarybutyl peroxide having a tertiary carbon atom attached to peroxy oxygen. Among the most useful peroxides of this type are 2,5-dimethyl-2,5-di(tertiarybutylperoxy)hexyne-3 and 2,5-dimethyl-2,5-di(tertiarybutylperoxy) hexane. Other peroxides can be selected from such compounds as dicumyl peroxide, dibenzoyl peroxide, tertiarybutyl perbenzoate, α,α'-bis(t-butylperoxy-diisopropylbenzene), and di[1,3-dimethyl-3-(t-butylperoxy)-butyl]carbonate. Generally, about 0.1–10 parts of peroxide per 100 parts of fluoropolymer is used.

Optional Additives

The curable fluoropolymer composition may contain further additives that may be selected to further optimize the system or to obtain particular desired properties. A particularly useful additive for use in the curable fluoropolymer composition is a coagent. Co-agents are well-known and generally used in peroxide curable fluoropolymers. They comprise a plurality of ethylenically unsaturated groups and generally do not have nucleophilic groups capable of reaction with the reactive sites of the fluoropolymer that are created upon dehydrofluorination. These coagents can be added in an amount equal to 0.1 and 10 parts per hundred parts fluoropolymer, preferably between 2 to 5 parts per hundred parts fluoropolymer. Examples of useful coagents include triallyl cyanurate; triallyl isocyanurate; triallyl trimellitate; tri(methylallyl) isocyanurate; tris(diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; N,N'-m-phenylenebismaleimide; diallyl-phthalate and tri(5-norbornene-2-methylene) cyanurate. Particularly useful is triallyl isocyanurate. Other useful coagents include the bis-olefins disclosed in EPA 0 661 304 A1, EPA 0 784 064 A1 and EPA 0 769 521 A1. It has been observed in connection with the present invention that particularly good bond strength may be achieved with a combination of a bonding promoter and one or more coagents as mentioned above.

The curable fluoropolymer composition will generally also include one or more acid acceptors. Acid acceptors can be inorganic or blends of inorganic and organic. Examples of inorganic acceptors include magnesium oxide, lead oxide, calcium oxide, calcium hydroxide, dibasic lead phosphite, zinc oxide, barium carbonate, strontium hydroxide, calcium carbonate, etc. Organic acceptors include epoxies, sodium stearate, and magnesium oxalate. The preferred acid acceptors are magnesium oxide and calcium hydroxide. The acid acceptors can be used singly or in combination, and preferably are used in amounts ranging from about 2 to 25 parts per 100 parts by weight of the fluoropolymer.

The fluoropolymer composition for providing the fluoropolymer layer may contain further additives, such as carbon black, stabilizers, plasticizers, lubricants, fillers, and processing aids typically utilized in fluoropolymer compounding can be incorporated into the compositions of the present invention, provided they have adequate stability for the intended service conditions.

The fluoropolymer compositions may be prepared by mixing fluoropolymer and further components as described in conventional rubber processing equipment. Such equipment includes rubber mills, internal mixers, such as Banbury mixers, and mixing extruders.

Curable Silicone Layer

The composition for the curable silicone layer comprises a silicone resin, also called silicone-containing polymer, a peroxide curative for curing the silicone resin and optional additives for the silicone-containing polymer. Useful peroxides for silicone layer are typically selected based on the rate of cure in the silicone elastomer. Silicone-containing elastomers are generally cured at temperature above room temperature, but at temperatures lower than those used for curing fluoropolymers. Such lower cure temperatures normally require curing agents, e.g., peroxides, with a low activation energy, i.e., only a low temperature is required to activate the curative.

In this invention, however, it is preferred that the activation energy of the peroxide curative selected for use in the silicone elastomer should be no less than the activation energy of the peroxide added to the fluoropolymer component. It is more preferred that the activation energy of each peroxide selected be substantially equal. Useful peroxides include the peroxide mentioned above in connection with the fluoropolymer layer and include in particular peroxides available commercially under Tradenames such as Perkadox™, Luperco™ and Trigonox™.

Useful addition levels of the peroxide curative are from 0.1 to 10 parts per one hundred parts of the curable silicone layer composition. Preferred addition levels are from 0.5 to 3 parts per hundred.

The curable silicone layer composition may contain further optional additives such as, for example, extending fillers, process aids, antioxidants and pigments are commonly used to obtain certain performance characteristics. Fumed silica is a common filler used to reinforce strength properties. Other additives used include precipitated silica, titanium dioxide, calcium carbonate, magnesium oxide and ferric oxide. Such additives may be available pre-mixed into the silicone resin. A 2-roll mill is a common method of addition of these reactive elements because such a mill has the ability to control temperature, or more importantly, to remove heat generated during the mixing process.

Method of Bonding the Layers Together and Producing an Article

Curing of the fluoropolymer layer and silicone layer and bonding of these layers to each other may be affected by heating the fluoropolymer layer provided on the silicone layer to a temperature of 120° C. to 200° C. and for 1 to 120 min (preferably 140° C. to 180° C. and for 3 to 60 min.). The heating may further be carried out while simultaneously applying pressure. Articles, i.e. multi-layer articles, having a fluoropolymer layer bonded to a silicone rubber in accordance with the invention can be produced by any of the known methods for making multi-layer articles. For example, the layers of the multi-layer article can be prepared in the form of thin films or sheets and then laminated together by application of heat, pressure, or combinations thereof to form a bonded multi-layer article. Alternatively, each of the layers can be co-extruded to form a multi-layer article. It is also possible to form one or more of the individual layers by extrusion coating, e.g., using a crosshead die. The heat and pressure of the method by which the layers are brought together (e.g. extrusion or lamination) can be sufficient to provide adequate adhesion between the layers. It may, however, be desirable to further treat the resulting article, for example, with additional heat, pressure, or both, to enhance the bond strength between the layers. One way of supplying additional heat when the multi-layer article is prepared by extrusion is by delaying the cooling of the multi-layer article at the conclusion of the extrusion process. Alternatively, additional heat energy can be added to the multi-layer article by laminating or extruding the layers at a temperature higher than necessary for merely processing the components. As another alternative, the finished multi-layer article can be held at an elevated temperature for an extended period of time. For example, the finished article can be placed in a separate apparatus for elevating the temperature of the article such as an oven or heated liquid bath. Combinations of these methods can also be used.

Several articles in which a fluoropolymer layer is bonded to a silicone rubber layer can be made according to the invention. Thus, according to one embodiment, the article may comprise a fuser member of a plain paper copier system. Such a fuser member may comprise a metal core covered with a silicone elastomer that is bonded to a fluoroelastomer fusing surface layer. Because of the use of the bonding promoter, firm bonding between the fluoroelastomer and silicone layer may be obtained in such a fuser system which may therefore be manufactured in a more convenient and easy way without the need for intermediate adhesive layers. According to another embodiment, a hose for use in for example a turbo engine can be made in which a layer of fluoroelastomer, generally as an innermost layer, is bonded to non-fluorine rubber, in particular a silicone rubber. Still further, the article may be a component of a fuel management system such as for example a fuel hose.

The following examples further illustrate the invention without however the intention to limit the invention thereto.

EXAMPLES

In the following examples and comparative examples, various composites of fluorochemical and silicone elastomers were prepared and the adhesion between the fluoropolymer and the silicone layer was evaluated. All percentages are by weight unless otherwise indicated.

Abbreviations

Gum 1: bisphenol curable copolymer fluoroelastomer gum, containing a fluoropolymer of 61.39% vinylidene fluoride (VDF) and 38.61% hexafluoropropylene (HFP), having a Mooney viscosity of about 41. This gum further comprises a bisphenol cure system comprising 1.15 phr $BF_6$, 0.28 phr TPBPCl and 0.38 phr FOSA.

Gum 2: bisphenol curable terpolymer fluoroelastomer gum containing a fluoropolymer of 22.3% tetrafluroethylene (TFE), 46.1% VDF and 32.2% HFP, having a Mooney viscosity of about 30. This gum further comprises a bisphenol cure system, comprising 0.7 phr $BF_6$, 0.244 phr TBMPPCI and 0.422 phr FOSA. Additionally 3 phr triallyl isocyanurate coagent were added.

Gum 3: bisphenol curable, copolymer fluoroelastomer gum, containing a fluoropolymer of 61.39% VDF and 38.61% HFP, having a Mooney viscosity of about 25. This gum further comprises a bisphenol cure system, comprising 1.12 phr $BF_6$, 0.26 phr TPBPCl and 0.34 phr FOSA.

Gum 4: bisphenol curable terpolymer fluoroelastomer gum containing a fluoropolymer of 22.3% TFE, 46.1% VDF and 32.2% HFP, having a Mooney viscosity of about 30. This gum further comprises a bisphenol cure system, comprising 1.46 phr $BF_6$ and 0.47 phr TPBPCl.

Gum 5: bisphenol curable terpolymer fluoroelastomer gum containing a fluoropolymer of 23.12% TFE, 34.32% VDF and 42.56% HFP, and having a Mooney viscosity of about 37. This gum further comprises a bisphenol cure system, comprising 2.35 phr BF6, 0.42 phr TBMPPCl, 0.36 phr TPS and 0.58 phr FOSA.

$BF_6$: bisphenol AF

TPBPCl: triphenyl benzyl phosphonium chloride

TBMPPCl: Tributyl methoxypropyl phosphoniumchloride

TPS: triphenylsulphonium

FOSA: fluorinated octyl N-methyl sulfonamide $Ca(OH)_2$: calcium hydroxide, Rhenofit™ CF, Rhein Chemie.

Carnauba wax: Flora™ 202, Int. Wax & Refining Co

Trigonox™ 101-45: organic peroxide, 45% active on silica carrier, Akzo Nobel

TAIC 70%: triallyl-isocyanurate, 70% on silicate carrier, Lehmann & Voss

CaO: calcium oxide, Rhenofit™ F, Rhein Chemie
MgO: magnesium oxide
Armeen™ 18D: octadecylamine, Akzo Nobel
SRF N-774: Semi reinforcing furnace carbon black, Degussa
-TAPC: tributyl allyl phosphonium chloride
Aerosil™ 200V: fumed silica, Degussa
MT N-990: carbon black, medium thermal grade, Degussa
Elastosil™ 760/70 and 401/70: extrusion grade silicone elastomers, Wacker
HV4/611: VMQ, GE/Bayer
Silquest™ A1100: triethoxy aminopropyl silane, Crompton
Vinylsilane 6490 DL70: Oligosiloxane, containing vinyl- and methoxy groups, Lehmann & Voss
Vinylsilane 6498 DL70: Oligosiloxane, containing vinyl- and methoxy groups, Lehmann & Voss
Silquest™ A-174: gamma-methacryloxypropyltrimethoxy-silane, Crompton Fluorochemical elastomer compounds were prepared on a two-roll mill by mixing compounds as given in table 1. The compounds are presented in parts by weight per hundred parts by weight of fluoroelastomer (phr) as is custom in the rubber industry.

Laminates of sheets of compositions for the fluorochemical elastomer and the silicone elastomer (to which was added 1 phr Trigonox™ 101-45) were made using a hot press (Agila 96/90) at 177° C. for 30 min. Prior to the actual lamination, a narrow strip of polyester film was inserted between the two sheets, at an edge, to create two tabs for insertion into each jaw of an adhesion testing apparatus. After cooling to room temperature for 4 hours, the laminated sheets were cut to a width of about 1 to 2 cm. The adhesion between the two layers was evaluated in accordance with ASTM D-1876, commonly known as a "T-peel" test, using an Instron™ mechanical tester. Cross-head speed was 50 mm/min. The results reported are the average values of at least three specimens. No post curing was applied to these laminates.

Examples 1 to 5 and Comparative Examples C-1 to C-4

In examples 1 to 5, laminates were made between fluoroelastomers and silicone elastomers, comprising low molecular weight siloxane compounds according to formula I. Therefore, in examples 1 to 3, the fluoroelastomer compounds 1, 2 and 14 respectively were laminated against Elastosil™ 760/70, comprising 0.95 phr Silquest™ A-1100. In examples 4 and 5, the fluorochemical compounds 1 and 2 were laminated against Elastosil™ 401/70, comprising 0.25 phr Silquest™ A-1100. The comparative examples C-1 to C-4 were made by laminating the fluorochemical compounds against the silicone compounds to which no additives were added. The results of the adhesion values are recorded in table 2.

TABLE 2

Adhesion test of laminates made from fluoroelastomer compounds and silicone compounds comprising siloxane compounds

| Ex | FC compound | Bond strength Peak (N/mm) | Bond strength Average (N/mm) | Failure |
|---|---|---|---|---|
| FC compound - Elastosil ™ 760/70 with 0.95 phr Silquest ™ A-1100 | | | | |
| 1 | 1 | 9.8 | 7.9 | RT |
| 2 | 2 | 9.9 | 6.7 | RT |
| 3 | 14 | 6 | 4.3 | RT |
| C-1 | 1 | 5.8 | 4 | RT/IF |

TABLE 1

Composition of fluorochemical elastomer compounds

| Fluorochemical compound | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Gum 1 | 100 | / | / | 100 | 100 | 100 | 100 | / | / | 100 | 100 | / | / | / |
| Gum 2 | / | 100 | / | / | / | / | / | 100 | 100 | / | / | 100 | / | / |
| Gum 3 | / | / | 100 | / | / | / | / | / | / | / | / | / | / | / |
| Gum 4 | / | / | / | / | / | / | / | / | / | / | / | / | 100 | / |
| Gum 5 | / | / | / | / | / | / | / | / | / | / | / | / | / | 100 |
| Vinylsilane 6490 | / | / | / | 2.15 | / | 4.28 | / | / | 4.28 | / | / | / | / | / |
| Vinylsilane 6498 | / | / | / | / | 8.57 | / | / | / | / | 4.28 | / | / | / | / |
| Trigonox ™ 101-45 | 1 | 1 | 1.5 | 1.5 | 1.5 | 1.5 | 1.5 | 1.5 | 1.5 | 1.5 | 1.5 | 1 | 1 | 1 |
| TAIC | 4.29 | / | / | / | / | 4.28 | / | / | / | 4.28 | 4.28 | / | / | 4.29 |
| Carnauba wax | 0.5 | 0.5 | / | 0.85 | 0.85 | 0.85 | 0.85 | 0.85 | 0.85 | 0.85 | 0.85 | 0.85 | 0.85 | 0.5 |
| Armeen ™ 18D | 0.5 | 0.5 | / | / | / | / | / | / | / | / | / | / | / | 0.5 |

Notes:
All compounds further contain 5 phr CaO, except compound 3 that contains 3 phr MgO.
All compounds, except compounds 1, 3 and 14 contain 15 phr SRFN-774. Compounds 3 and 14 additionally contain 30 phr MT N-990.
All compounds contain 5 phr Ca(OH)$_2$, except compound 3 that contains 6 phr Ca(OH)$_2$. Compound 1 further contains 0.75 phr TAPC and 10 phr Aerosil ™ 200 V.

TABLE 2-continued

Adhesion test of laminates made from fluoroelastomer compounds and silicone compounds comprising siloxane compounds

| Ex | FC compound | Bond strength Peak (N/mm) | Bond strength Average (N/mm) | Failure |
|---|---|---|---|---|
| C-2 | 2 | 2.9 | 1.3 | RT/IF |
| C-3 | 14 | 4.2 | 2.9 | IF |
| FC compound - Elastosil ™ 401/70 with 0.25 phr Silquest ™ A-1100 | | | | |
| 4 | 1 | 6.3 | 4.9 | RT |
| 5 | 2 | 4.5 | 4.3 | RT |
| C-4 | 2 | 0.8 | 0.5 | IF |

Notes:
IF = interfacial failure, real indication of bond strength
RT = rubber tear, indicated that the bond was stronger than the elastomer itself.
RT/IF = rubber tear/interfacial failure: no homogeneous bond was made The results in table 2 indicate a significant increase in adhesion between the fluoroelastomer compound and the silicone compound, containing a low molecular weight siloxane compound as bonding promoter. Very strong laminates could be made.

Examples 6 to 10 and Comparative Examples C-5 and C-6

Examples 6 to 10 were made in order to evaluate the influence of an oligosiloxane bonding promoter according to formula III, added to the fluorochemical compound. Therefore, laminates were made between fluorochemical compounds, comprising vinylsilane 6490 DL70 or 6498 DL70, as given in table 3, and silicone compounds HV4/611 or Elastosil™ 760/70. In comparative examples C-5 and C-6, fluorochemical compounds, without addition of oligosiloxane were laminated against the silicone compounds. The adhesion properties of the laminates are recorded in table 3.

TABLE 3

Adhesion test of laminates made from fluoroelastomer compounds, comprising oligosiloxane, and silicone compounds

| Ex | FC compound | Bond strength Peak (N/mm) | Bond strength Average (N/mm) | Failure |
|---|---|---|---|---|
| FC compound, comprising vinylsilane 6490 or 6498-HV4/611 | | | | |
| 6 | 4 | 5.1 | 3.8 | IF |
| 7 | 5 | NP | 3.6 | IF |
| 8 | 6 | 10.6 | 6.8 | RT |
| C-5 | 7 | 0.4 | 0.3 | IF |
| FC compound, comprising vinylsilane 6490 or 6498 - Elastosil™ 760/70 | | | | |
| 9 | 6 | 6.2 | 5.2 | RT |
| 10 | 10 | 5.8 | 4.4 | RT |
| C-6 | 11 | 4.9 | 2.6 | RT/IF |

Note:
NP: not peak observed

The results as given in table 3 clearly demonstrate that oligosiloxanes, added to the fluorochemical compound, had a major influence on the adhesion between the fluorochemical and the silicone compound. Strong laminates could be made.

Examples 11 and 12 and Comparative Example C-7

Examples 11 and 12 were made in order to evaluate the influence of a bonding promoter according to formula IV. Therefore, laminates were made between fluorochemical terpolymer compounds, optionally comprising oligosiloxane, and silicone compound Elastosil™ 760/70, having 1.5 phr p-vinylaniline. As comparative example C-7, a laminate was made between the fluorochemical compound and Elastosil™ 760/70 without bonding promoter. The results of the adhesion are given in table 4.

TABLE 4 adhesion of laminates between fluorochemical and silicone compound

| Ex | FC compound | 6490 DL 70 in fluorochemical compound | p-vinylaniline in Elastosil™ 760/70 | Bond strength Peak (N/mm) | Bond strength Average (N/mm) | Failure |
|---|---|---|---|---|---|---|
| 11 | 8 | / | 1.5 | 9.3 | 6.4 | RT |
| 12 | 9 | 4.28 | 1.5 | 10.9 | 8.1 | RT |
| C-7 | 8 | / | / | 1.2 | 0.9 | IF |

The results in table 4 indicated that a considerable increase in adhesion between fluorochemical and silicone compound could be obtained when a bonding promoter according to formula IV was added to the silicone compound. A further increase in adhesion could be obtained when additionally a bonding promoter as eg. an oligosiloxane, according to formula III, was added to the fluorochemical compound.

Examples 13 to 26 and Comparative Examples C-8 and C-9

In examples 13 to 26 further examples of bonding promoters, according to formula IV were evaluated. Laminates were made between fluorochemical compounds and Elastosil™ 760/70, to which different bonding promoters were added. The composition of the laminates is given in table 5. As comparative examples C-8 and C-9, laminates were made between the fluorochemical compounds and the silicone compound without additive. The adhesion between the two compounds was measured and the results are given in table 5.

TABLE 5

Adhesion between fluorochemical compound and silicone compound, comprising a bonding promoter

| Ex | FC comp | Amount of silicone additive | Bond strength Peak (N/mm) | Bond strength Average (N/mm) | Failure |
|---|---|---|---|---|---|
| Elastosil™ 760/70 containing 3-aminopropyl vinylether | | | | | |
| 13 | 8 | 0.5 | 9.3 | 7.5 | RT |
| 14 | 8 | 0.25 | 7.6 | 6.6 | RT |
| Elastosil™ 760/70 containing diallylamine | | | | | |
| 15 | 8 | 0.5 | 8.6 | 5.8 | RT |
| 16 | 11 | 0.5 | 7.7 | 5.4 | RT |
| 17 | 12 | 0.5 | 9.1 | 7.4 | RT |
| 18 | 13 | 0.5 | 7.5 | 5.9 | RT |
| 19 | 8 | 0.25 | 6.9 | 5.4 | RT |
| 20 | 11 | 0.25 | 7.3 | 5.3 | RT |
| 21 | 12 | 0.25 | 8.4 | 5.9 | RT |
| Elastosil™ 760/70 containing 2,2'-diallylbisphenol A | | | | | |
| 22 | 8 | 0.5 | NP | 5.2 | IF |
| 23 | 11 | 0.5 | NP | 4.2 | IF |
| 24 | 8 | 0.25 | 7.1 | 5.4 | RT |
| 25 | 11 | 0.25 | 9.1 | 6.4 | RT |
| Elastosil™ 760/70 containing 7-octene-1,2-diol | | | | | |
| 26 | 8 | 0.5 | 3.9 | 3.2 | RT |
| Elastosil™ 760/70 without additive | | | | | |
| C-8 | 8 | / | 1.1 | 0.8 | RT/IF |
| C-9 | 11 | / | 4.9 | 2.6 | RT/IF |

The results indicate that strong laminates can be made between a fluorochemical elastomer and a silicone elastomer, comprising a bonding promoter according to formula IV.

Example 27 and Comparative Example C-10

Example 27 was made in order to evaluate the influence of a bonding promoter according to formula II. Therefore, a laminate was made between fluorochemical copolymer compound 3 and silicone compound Elastosil™ 760/70, having 1 phr Silquest™ A-174. As comparative example C-10, a laminate was made between fluorochemical compound 3 and Elastosil™ 760/70 without bonding promoter. The results of the adhesion are given in table 6.

TABLE 6 bonding between fluorochemical and silicone compound comprising Silquest ™ A-174

| Ex | FC compound | Bond strength Peak (N/mm) | Bond strength Average (N/mm) | Failure |
|---|---|---|---|---|
| FC compound - Elastosil ™ 760/70 with 1 phr Silquest ™ A-174 | | | | |
| 27 | 3 | NP | 1.1 | IF |
| C-10 | 3 | NP | 0.5 | IF |

Also in this case, an improvement in bond strength can be noticed when a bonding promoter according to formula II is incorporated in the silicone compound.

What is claimed is:

1. Method of bonding a fluoroelastomer layer to a silicone rubber layer, the method comprising:
   (i) providing a layer of a curable fluoropolymer composition comprising (a) a fluoropolymer capable of being dehydrofluorinated thereby forming reactive sites, (b) a dehydrofluorinating agent, (c) a curing agent capable of cross-linking said fluoropolymer through reaction with said reactive sites and (d) a peroxide;
   (ii) contacting said layer of said curable fluoropolymer composition with a curable silicone layer comprising a silicone resin and a peroxide;
curing said layers while being in contact with each other at conditions sufficient to (a) cause dehydrofluorination of said fluoropolymer and cross-linking of said fluoropolymer layer and (b) cross-linking of said silicone resin, said curing being carried out in the presence of a bonding promoter selected from the group consisting of an organic compound having one or more nucleophilic groups capable of reacting with said reactive sites of said fluoropolymer or having a precursor of said nucleophilic groups and one or more functional groups selected from ethylenically unsaturated groups, siloxy groups having at least one hydrolysable group and mixtures thereof, said bonding promoter being present in said layer of curable fluoropolymer and/or said curable silicone layer.

2. Method according to claim 1 wherein said bonding promoter is an organic compound that comprises an amino group or a hydroxy group and an ethylenically unsaturated group and wherein said bonding promoter is contained in said curable silicone layer.

3. Method according to claim 1 wherein said bonding promoter is an organic compound that comprises an amino group or a hydroxy group and a siloxy group having at least one hydrolysable group and wherein said bonding promoter is contained in said curable silicone layer.

4. Method according to claim 1 wherein said bonding promoter is a siloxane having a plurality of ethylenically unsaturated groups and having one or more hydrolysable groups and wherein said bonding promoter is contained in said layer of curable fluoropolymer.

5. Method according to claim 4 wherein said siloxane is a polysiloxane corresponding to the formula:

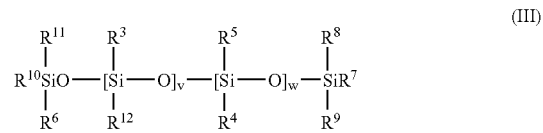

(III)

wherein $R^{3-12}$ each independently represents a hydrolysable group, a hydroxy group, $NH_2$ or NHR with R representing a hydrocarbon group, with the proviso that at least one of $R^{3-12}$ is a group selected from a hydrolysable group, a hydroxy group, $NH_2$ and NHR and at least one of $R^{3-12}$ is a hydrocarbon group that contains an ethylenically unsaturated group, v and w each independently have a value of 0 to 20.

6. Method according to claim 1 wherein a bonding promoter as defined in claim 2 or 3 is contained in said layer of curable fluoropolymer composition and a bonding promoter as defined in claim 4 or 5 is contained in said curable silicone layer.

7. Method according to claim 1 wherein said bonding promoter is present in an amount of 0.75% by weight to 15% by weight in said layer of curable fluoropolymer composition or in an amount of 0.1 to 2% by weight in said curable silicone layer.

8. Method according to claim 1 wherein said curing agent is a polyhydroxy compound.

9. Method according to claim 1 wherein said dehydrofluorinating agent is a base or an organo onium compound.

10. Method according to claim 1 wherein said layer of said curable fluoropolymer further comprises a coagent having a plurality of ethylenically unsaturated groups but not containing nucleophilic groups or precursors thereof.

11. Laminate comprising (i) a layer of a curable fluoropolymer composition comprising (a) a fluoropolymer capable of being dehydrofluorinated thereby forming reactive sites, (b) a dehydrofluorinating agent, (c) a curing agent capable of cross-linking said fluoropolymer through reaction with said reactive sites and (d) a peroxide; (ii) in direct contact with said layer of curable fluoropolymer composition, a curable silicone layer comprising a silicone resin and a peroxide and (iii) a bonding promoter contained in said layer of curable fluoropolymer composition and/or said curable silicone layer, said bonding promoter being selected from the group consisting of an organic compound having one or more nucleophilic groups capable of reacting with said reactive sites of said fluoropolymer or having a precursor of said nucleophilic groups and one or more functional groups selected from ethylenically unsaturated groups, siloxy groups having at least one hydrolysable group and mixtures thereof.

12. Laminate according to claim 11 wherein said bonding promoter is an organic compound that comprises an amino group or a hydroxy group and an ethylenically unsaturated group and wherein said bonding promoter is contained in said curable silicone layer.

13. Laminate according to claim 11 wherein said bonding promoter is an organic compound that comprises an amino group or a hydroxy group and a siloxy group having at least one hydrolysable group and wherein said bonding promoter is contained in said curable silicone layer.

14. Laminate according to claim 11 wherein said bonding promoter is a siloxane having a plurality of ethylenically unsaturated groups and wherein said bonding promoter is contained in said layer of curable fluoropolymer.

15. Laminate according to claim 14 wherein said siloxane is a polysiloxane corresponding to the formula:

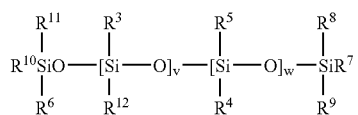
(III)

wherein $R^{3-12}$ each independently represents a hydrolysable group, a hydroxy group, $NH_2$ or NHR with R representing a hydrocarbon group, with the proviso that at least one of $R^{3-12}$ is a group selected from a hydrolysable group, a hydroxy group, $NH_2$ and NHR and at least one of $R^{3-12}$ is a hydrocarbon group that contains an ethylenically unsaturated group, v and w each independently have a value of 0 to 20.

16. Laminate according to claim 11 wherein a bonding promoter as defined in claim 12 or 13 is contained in said layer of curable fluoropolymer and a bonding promoter as defined in claim 14 or 15 is contained in said curable silicone layer.

17. Laminate according to claim 11 wherein said bonding promoter is present in an amount of 0.75% by weight to 15% by weight in said layer of curable fluoropolymer composition or in an amount of 0.1 to 2% by weight in said curable silicone layer.

18. Laminate according to claim 11 wherein said curing agent is a polyhydroxy compound.

19. Laminate according to claim 11 wherein said dehydrofluorinating agent is a base or an organo onium compound.

20. Laminate according to claim 11 wherein said layer of said curable fluoropolymer further comprises a coagent having a plurality of ethylenically unsaturated groups but not containing nucleophilic groups or precursors thereof.

21. Article obtainable with the method according to claim 1.

22. Article according to claim 21 wherein said article is a component of a fuel management system or a hose for connecting the compressor of a turbo engine to an intercooler.

* * * * *

UNITED STATES PATENT AND TRADEMARK OFFICE
CERTIFICATE OF CORRECTION

PATENT NO. : 7,070,842 B2
APPLICATION NO. : 10/757044
DATED : July 4, 2006
INVENTOR(S) : Steven G. Corveleyn It is certified that error appears in the above-identified patent and that said Letters Patent is hereby corrected as shown below:

On The Title Page (item 56)
Column First Page Col. 2 (U.S. Patent Documents) -- Line 2 - After "6,906,145" delete "B1" and insert -- B2 --, therefor.

On The Title Page (item 56)
Column First Page Col. 2 (U.S. Patent Documents) -- Line 3 - After "6,916,871" delete "B1" and insert -- B2 --, therefor.

Column 4 -- Line 66 - Delete "HO—$(CH_2)_4$—$Si(OCH_3)_2$—$(C_2H_5)$" and insert --HO-$(CH_2)_4$-$Si(OCH_3)_2(C_2H_5)$ --, therefor.

Column 18 -- Line 9 (Approx.) - In Claim 5, below "formula:" delete "(III)".

Column 19 -- Line 10 - In Claim 15, below "formula:" delete "(III)".

Signed and Sealed this

Twenty-eighth Day of November, 2006

JON W. DUDAS
*Director of the United States Patent and Trademark Office*